United States Patent
Bozzone et al.

[11] Patent Number: 5,920,456
[45] Date of Patent: Jul. 6, 1999

[54] PRE-ASSEMBLED ELECTRICAL PANEL BONDING SCREW

[75] Inventors: Christopher J. Bozzone, Duluth; William E. Rose, Grayson, both of Ga.

[73] Assignee: Siemens Energy & Automation, Inc., Alpharetta, Ga.

[21] Appl. No.: 08/826,116

[22] Filed: Mar. 27, 1997

[51] Int. Cl.⁶ .................................................. H02B 1/01
[52] U.S. Cl. ........................ 361/627; 361/637; 361/641; 361/648; 174/59; 439/95; 439/101; 439/801; 411/337
[58] Field of Search ..................... 361/627, 628, 361/629, 630, 631, 637, 641, 642, 643, 644, 646, 647, 648; 174/59, 65 R; 439/95, 100, 101, 301

[56] References Cited

U.S. PATENT DOCUMENTS

| | | |
|---|---|---|
| 1,449,460 | 3/1923 | Thomas . |
| 2,666,908 | 1/1954 | Klostermann . |
| 2,873,435 | 2/1959 | Hubbell . |
| 2,934,679 | 4/1960 | Johnson et al. . |
| 3,265,937 | 8/1966 | Sturdivan . |
| 3,312,874 | 4/1967 | Stanback . |
| 3,340,497 | 9/1967 | Balint . |
| 3,426,321 | 2/1969 | Peterson, Jr. . |
| 3,590,332 | 6/1971 | Anderson et al. ...................... 361/650 |
| 3,668,591 | 6/1972 | Kobryner ................................ 439/724 |
| 3,823,381 | 7/1974 | Maloff . |
| 3,967,875 | 7/1976 | Stanaitis . |
| 3,986,544 | 10/1976 | Jones et al. . |
| 4,020,400 | 4/1977 | Hawkes, Jr. et al. . |
| 4,040,715 | 8/1977 | Debaigt . |
| 4,056,301 | 11/1977 | Norden . |
| 4,261,402 | 4/1981 | Stanaitis . |
| 4,435,739 | 3/1984 | Shelvik . |
| 4,478,478 | 10/1984 | Durand et al. . |
| 4,519,668 | 5/1985 | Fujita et al. . |
| 4,542,953 | 9/1985 | Iwamoto . |
| 4,570,338 | 2/1986 | Ignatowicz . |
| 4,603,376 | 7/1986 | Maier . |
| 4,630,882 | 12/1986 | Naylor et al. . |
| 4,632,491 | 12/1986 | Lutz . |
| 4,650,272 | 3/1987 | Doughty et al. . |
| 4,695,923 | 9/1987 | Abraham . |
| 4,716,496 | 12/1987 | Fritsch . |
| 4,768,259 | 9/1988 | Rock et al. . |
| 4,836,793 | 6/1989 | Munroe . |
| 4,900,259 | 2/1990 | Ludwig et al. . |
| 4,905,122 | 2/1990 | Culnan et al. . |
| 4,921,455 | 5/1990 | Marie et al. . |
| 5,041,026 | 8/1991 | Hansel . |
| 5,064,324 | 11/1991 | Ragaller . |
| 5,328,311 | 7/1994 | Knohl . |
| 5,393,942 | 2/1995 | Reiner et al. ........................... 361/627 |
| 5,511,301 | 4/1996 | McGuire . |
| 5,570,982 | 11/1996 | Lautenschlager . |
| 5,696,664 | 12/1997 | Rose ....................................... 361/639 |

*Primary Examiner*—Leo P. Picard
*Assistant Examiner*—Boris L. Chervinsky

[57] ABSTRACT

A bonding screw is pre-assembled in a distribution panel in a non-bonding position that does not bond a neutral bar within the panel enclosure to the enclosure wall. This allows an installer of the panel to select between the option of maintaining the bonding screw in the pre-assembled non-bonding position and the option of positioning the bonding screw from non-bonding position to a bonding position. A basepan is disposed within the enclosure between the neutral bar and the enclosure's back wall. The non-bonding position is defined by the screw shank thread having a threaded engagement with a through-hole in a basepan, the head of the bonding screw being spaced from the neutral bar, and the shank of the bonding screw being spaced from the enclosure's back wall. The bonding position is defined by the head of the electrically conductive part being disposed against the neutral bar and the shank being threaded into an extruded hole in the enclosure's back wall.

9 Claims, 3 Drawing Sheets

PRE-ASSEMBLED ELECTRICAL PANEL BONDING SCREW

REFERENCE TO A RELATED APPLICATION AND INCORPORATION BY REFERENCE

This invention is an improvement in certain subject matter of commonly-owned, pending U.S. patent application Ser. No. 08/622,971, filed Mar. 27, 1996, whose entire disclosure is incorporated by reference as if fully disclosed herein.

FIELD OF THE INVENTION

This invention relates generally to electrical panels, such as load centers and downstream feeder panels for example, that are used to distribute electric power from a utility to various load circuits through circuit protection devices such as electric circuit breakers.

BACKGROUND AND SUMMARY OF THE INVENTION

The above-referenced, commonly-owned, pending U.S. patent application discloses an electrical panel that comprises a walled enclosure containing an electrically non-conductive basepan mounted therein. The enclosure and basepan are generally rectangular in shape. A respective one of a pair of neutral bars is disposed along a respective side of the basepan opposite, and parallel to, the other. These neutral bars provide for the connection of individual neutral return wires of individual load circuits to a neutral that is provided by the electric power utility. The neutral from the electric power utility may be brought into the panel by one or more incoming neutral cables fastened to a neutral tie bar inside the panel. The neutral tie bar is disposed against a side of the basepan transverse to the sides against which the pair of neutral bars are disposed, and each of its opposite ends is mechanically fastened in electrically conductive relationship to a respective end of a respective neutral bar.

The electric power utility generally maintains the neutral at, or fairly close to, ground potential, i.e., zero volts electric potential referenced to ground. In at least some panel installations, the enclosure is connected to ground by a ground path that may include a ground cable extending from the panel to a suitable ground location. In any installation where it may be necessary to assure that there will be no potential difference between the utility neutral and ground, a conductive path is provided within the panel between the grounded enclosure and certain panel components, such as the neutral bars and the neutral tie bar, that are connected to the electric power utility neutral. Creating such a conductive path is sometimes referred to as bonding, and a known means for accomplishing bonding comprises a bonding screw, as described in the referenced, commonly-owned, pending U.S. patent application.

It is believed that such bonding has heretofore been performed by an installer of a panel whenever bonding is required. While a panel construction may have been adapted for possible bonding by providing a hole in a neutral bar or a neutral tie bar, and an underlying hole in the enclosure, the bonding screw has been a separate part installed by an installer whenever a given panel requires bonding. The referenced, commonly-owned, pending U.S. patent application provides for possible bonding by having the installer pass a bonding screw through pre-existing aligned clearance holes in the neutral tie bar and the underlying basepan, and threading the screw shank into a pre-existing hole in the back wall of the enclosure.

Because such a bonding screw is a separate part, the possibility exists that it may be lost or misplaced prior to installation. Moreover, an installer must perform the operations of inserting the bonding screw through the aligned clearance holes in the neutral tie bar and the underlying basepan, locating the tip of the screw shank in the pre-existing enclosure hole, and then threading the crew shank into the enclosure to finally abut the head of he screw against the neutral tie bar.

The present invention is directed to an improvement wherein a bonding screw is pre-assembled in a panel and pre-positioned therein for optional bonding whenever bonding is required. All that an installer need do to accomplish bonding is merely engage the bonding screw head by means of a suitable tool, such as a screwdriver, and then turn the screw to advance it more fully toward the back wall of the enclosure until further advancement is stopped by abutment of the screw head with the neutral tie bar. As the screw is being advanced, the tip of its shank threads into an aligned hole in the back wall of the enclosure. Bonding is completed when the head of the bonding screw abuts the neutral tie bar, creating a suitable electrical path between the neutral tie bar and the enclosure so that the possibility of a potential difference between them is foreclosed.

It is believed that the present invention provides meaningful economy because a bonding screw can be readily pre-assembled in desired pre-position at the factory by automated process, and at time of panel installation, an installer need not locate and assemble the bonding screw in the prior manner described above. Although a bonding screw is pre-assembled, a further advantage of its particular pre-positioning is that it is sufficiently spaced from the enclosure to comply with any installation requirements that may preclude bonding, for example when a panel is a downstream feeder panel.

It is an object of the invention to provide an electric distribution panel comprising: a walled enclosure comprising an electrically conductive wall forming a portion of the enclosure; an electrically conductive neutral bar disposed within the enclosure; an electrically non-conductive part disposed between the neutral bar and the wall to place the neutral bar in a non-bonded relationship to the wall; a through-hole in the neutral bar; a through-hole in the electrically non-conductive part in underlying registry with the through-hole in the neutral bar; an electrically conductive part adapted for optional bonding of the neutral bar to the wall, the electrically conductive part comprising a head and a shank extending distally from the head, the shank comprising a thread; wherein the electrically conductive part is pre-assembled to the non-conductive part in a non-bonding position not bonding the neutral bar to the wall so as thereby to allow an installer of the panel to select between the option of maintaining the electrically conductive part in the pre-assembled non-bonding position and the option of positioning the electrically conductive part from non-bonding position to a bonding position wherein the electrically conductive part bonds the neutral bar to the wall; wherein the pre-assembled non-bonding position is defined by the shank thread having a threaded engagement with the through-hole in the electrically non-conductive part, the head of the electrically conductive part being spaced from the neutral bar, and the shank being spaced from the wall; and wherein the bonding position is defined by the head of the electrically conductive part being disposed against the neutral bar, and the shank being disposed against the wall.

It is still another object of the invention to provide an electric distribution panel as set forth above wherein the wall comprises a hole in underlying registry with the through-holes in the neutral bar and in the electrically non-conductive part, and the shank thread threads into the hole in the wall when the electrically conductive part is placed in bonding position.

It is still another object of the invention to provide an electric distribution panel as set forth above wherein the hole in the wall is an extruded hole, and the shank thread comprises a self-tapping thread that threads into the extruded hole in the wall when the electrically conductive part is placed in bonding position.

It is still another object of the invention to provide an electric distribution panel as set forth above wherein the shank thread has at least two full turns of engagement with the extruded hole in the wall when the electrically conductive part is placed in bonding position.

It is still another object of the invention to provide an electric distribution panel as set forth above wherein the neutral bar is a neutral tie bar that is at a right angle to, and ties together, plural neutral bars together.

It is still another object of the invention to provide an electric distribution panel as set forth above wherein the electrically non-conductive part comprises a basepan disposed between the neutral bars and the wall.

It is still another object of the invention to provide an electric distribution panel as set forth in above wherein the threaded engagement of the shank thread with the through-hole in the electrically non-conductive part has a frictional engagement lying within a range from about five inch-pounds of torque to about eight inch-pounds of torque when the electrically non-conductive part is in pre-assembled position.

It is still another object of the invention to provide an electric distribution panel as set forth above wherein the shank is spaced at least one-half inch from the wall when the electrically non-conductive part is in pre-assembled position.

It is still another object of the invention to provide an electric distribution panel as set forth above wherein the shank thread maintains a threaded engagement with the through-hole in the electrically non-conductive part when the electrically non-conductive part is in bonding position.

The foregoing, along with further features, advantages, and benefits of the invention, will be seen in the ensuing description and claims, which are accompanied by drawings. The description and drawings disclose a presently preferred embodiment of the invention according to the best mode contemplated at this time for carrying out the invention.

DESCRIPTION OF THE PREFERRED EMBODIMENT

Figure 1:
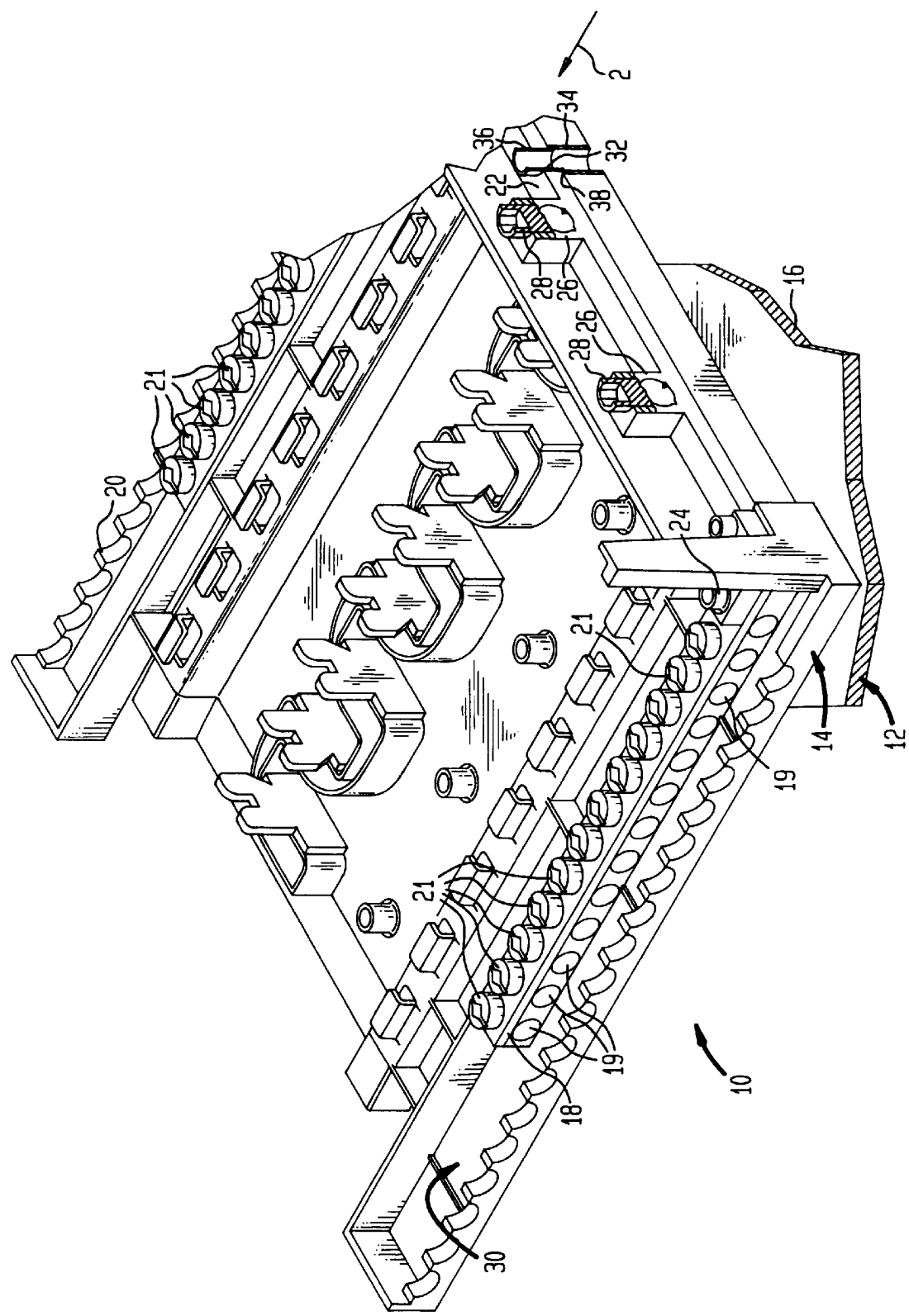
FIG. 1 is a fragmentary perspective view of a portion of an exemplary electrical panel behind the deadfront embodying bonding principles of the present invention, certain portions having been removed for illustrative presentation.

FIG. 1 shows a portion of an electrical panel 10 comprising an enclosure 12 and a basepan 14. The particular panel shown is of a type sometimes referred to as a load center. The entire enclosure 12 is formed of electrically conductive metal and is of generally rectangular shape, having a front wall, a back wall 16 and four side walls, a portion of back wall 16 being the only portion of enclosure 12 appearing in FIG. 1.

Basepan 14 is formed of electrically non-conductive material and is of generally rectangular shape for fitting within the interior of enclosure 12. The front wall of enclosure 12 comprises a door that is latched closed but can be unlatched for swinging open to expose the deadfront and the circuit breaker handles that protrude through openings in the deadfront. Electrical apparatus is contained within enclosure 12 behind the deadfront. The electrical apparatus includes a pair of neutral bars 18, 20, each of which is disposed along a respective side of basepan 14 opposite, and parallel to, the other. These neutral bars comprise a series of apertures 19 and fasteners 21 that provide for the connection of individual neutral return wires (not shown) of individual load circuits to the neutral that is provided by the electric power utility. The neutral from the electric power utility may be brought into the panel by one or more incoming neutral cables (not shown) fastened to a neutral tie bar 22 inside enclosure 12. Neutral tie bar 22 is disposed against a side of basepan 14 perpendicular to the sides against which neutral bars 18, 20 are disposed, and each of its opposite ends is mechanically fastened in electrically conductive relationship to a respective end of a respective neutral bar, such as by a screw 24. Neutral tie bar 22 comprises at least one upstanding lug 26 into which an end of a neutral cable can be inserted and held clamped in place by a set screw 28.

The neutral bars are disposed in respective slots 30 of basepan 14 and the neutral tie bar comprises through-holes 32 via which it is mounted on basepan 14 so as to be electrically isolated from enclosure 12. Basepan 14 is itself secured on enclosure 12 by suitable attachment means.

Basepan 14 comprises stepped mounting posts 34 whose ends 36 pass through and beyond through-holes 32 in neutral tie bar 22 while the margin surrounding each through-hole 32 is spaced slightly from a circular stepped ledge 38 of the respective post 34. Where ends 36 protrude through the neutral tie bar through-holes, they are subsequently deformed, such as by heat staking, to assist in holding the neutral tie bar.

Basepan 14 comprises further features for the mounting of circuit breakers (not shown) in two adjacent rows, one row being adjacent and functionally associated with one of neutral bars 18, 20, and the other row being adjacent and functionally associated with the other neutral bar. The particular circuit breakers that are used in the illustrated embodiment are back-fed type circuit breakers, and they are fed line voltage by features that are not visible in the view of FIG. 1.

The foregoing description of FIG. 1 has been given for the purpose of providing sufficient constructional detail of panel 10 preparatory to presenting detailed disclosure of the improvement that is the subject of the present invention. Should the reader desire additional information about more specific aspects of panel 10 that are not believed to concern the present invention, the referenced, commonly-owned, pending U.S. patent application may be consulted.

Figure 2:
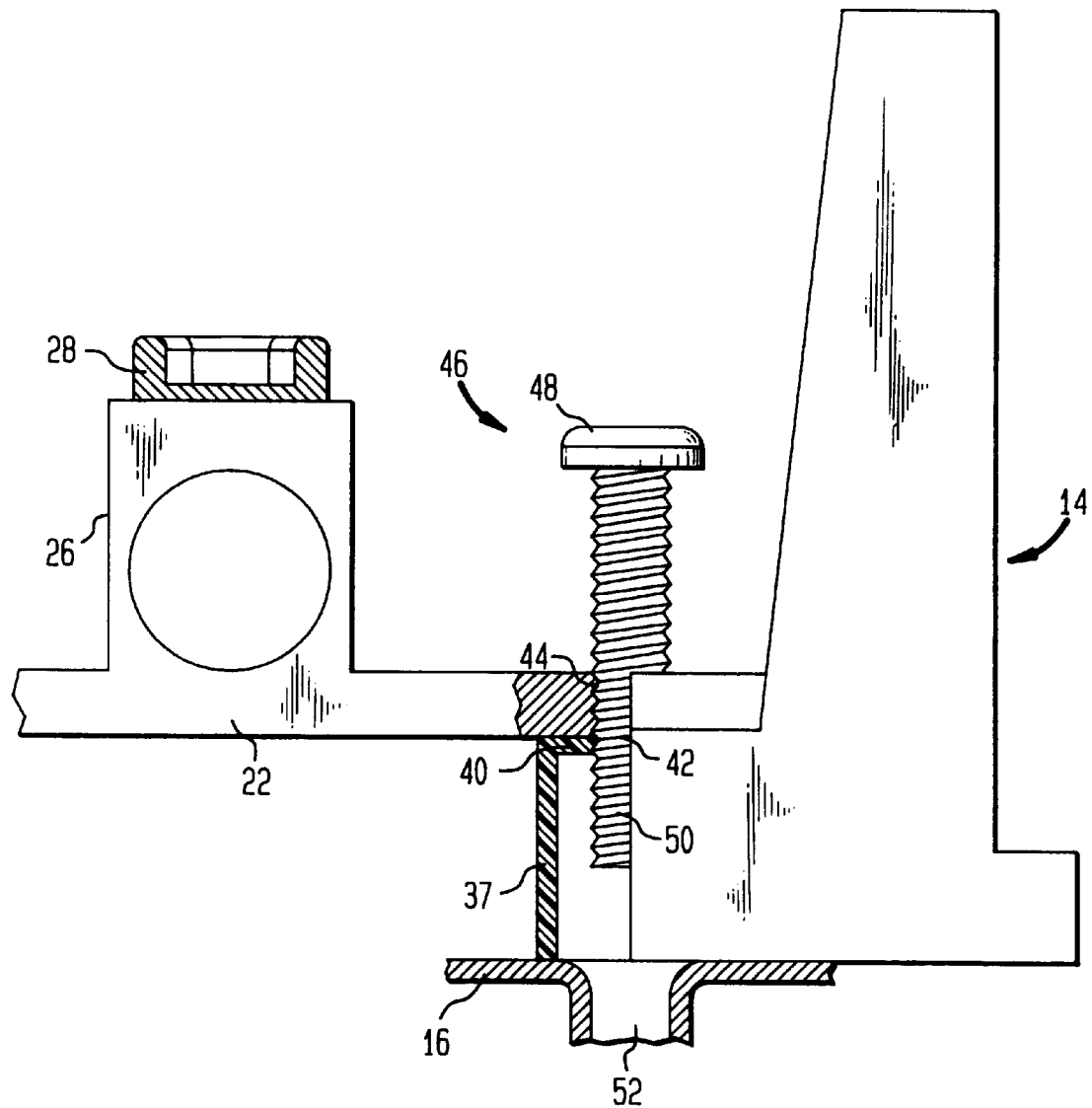
FIG. 2 is an enlarged fragmentary view, partly in cross section, in the general direction of arrow 2 in FIG. 1, showing a pre-assembled bonding screw in non-bonding position.

Although the near right-hand corner of basepan 14 has been broken away from FIG. 1, it is essentially a mirror image of the near left-hand corner, and FIG. 2 discloses a view, on an enlarged scale, that reveals the general appearance of that near right-hand corner, looking in the general direction of arrow 2 in FIG. 1. Although the back of basepan 14 is disposed against back wall 16 of enclosure 12, actual contact is localized at various locations.

At the location shown by FIG. 2, basepan 14 is formed with a boss, or riser, 37 that extends frontally from the back of the basepan to provide a wall 40 which closely confronts a portion of neutral tie bar 22. Wall 40 comprises a circular through-hole 42 that registers in substantial coaxial alignment with a further circular through-hole 44 in neutral tie bar 22.

A bonding screw 46 that comprises a head 48 and a threaded shank 50 extending distally from the head is pre-assembled in a particular manner. Through-hole 44 is slightly larger than the crest diameter of the thread of shank 50 to allow the distal end of the shank to pass with clearance through through-hole 44. The diameter of through-hole 42 is slightly smaller than the crest diameter of the thread of shank 50 so that the shank will thread into the circular cylindrical surface of through-hole 42 when a suitable tool (not shown) is engaged with a tool engagement surface in screw head 48 and rotated to advance the screw in a direction toward back wall 16. By suitable selection of the respective materials of basepan 14 and screw 46, and of the diameter of through-hole 42 in relation to the shank screw thread, the shank can readily self-tap into the through-hole.

Bonding screw 46 is advanced a certain amount so that it will be pre-assembled in a desired position where the tip of its distal end is spaced at least a certain minimum distance from back wall 16 of enclosure 12. FIG. 2 depicts this pre-position, which represents a non-bonding position of bonding screw 46. In this pre-position, the frictional engagement of the screw thread with through-hole 42 maintains bonding screw 46 in this pre-position during the typical shipping and handling that is encountered between the time of bonding screw pre-assembly at the factory and final panel installation, such as in a building. By way of example, frictional engagement that provides a holding torque lying within a range from about five inch-pounds to about eight inch-pounds has been found satisfactory for a 32 turns per inch screw thread.

By spacing the tip end of the screw shank at least a certain minimum distance from back wall 16, compliance with relevant specifications and/or standards for non-bonding of the neutral bars and neutral tie bar is obtained. Yet, the invention provides for expeditious bonding when bonding is required.

Figure 3:
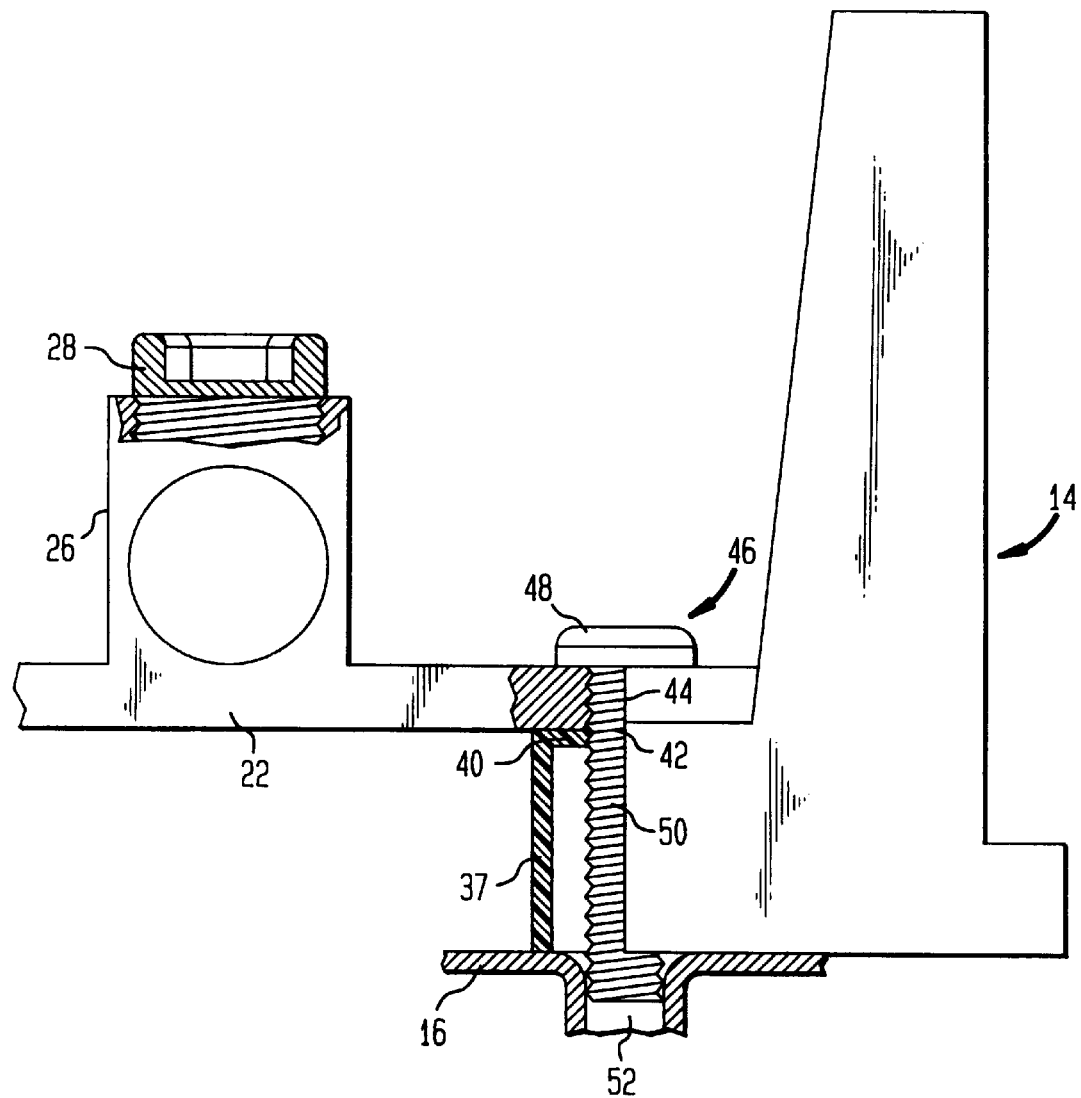
FIG. 3 is a view similar to FIG. 2, but with the bonding screw having been operated to bonding position.

Panel wall 16 comprises an extruded through-hole 52 in substantial coaxial alignment with screw 46. When bonding is required, an installer merely uses a suitable tool to further advance screw 46 from its pre-assembled non-bonding position until the threaded screw shank self-taps into through-hole 52 and head 48 forcefully abuts the margin of neutral tie bar 22 surrounding through-hole 44, as shown by FIG. 3. The dimensions of screw 46 are such that upon head 48 abutting neutral tie bar 22, sufficient engagement of the screw thread with through-hole 52 has taken place to assure suitable electrical contact between them. For a bonding screw which has a thread of 32 turns per inch, it is believed to be desirable for such engagement to comprise at least two full turns of the thread.

From the foregoing, it can be appreciated that both manufacturing and installation conveniences and economies have been provided by the present invention. Manufactured panels may be standardized for shipment without bonding. If bonding of a panel is not required, the bonding screw simply remains in its pre-assembled, non-bonding position. If bonding of a panel is required, the bonding screw is simply fully advanced by the installer to bonding position.

While the present invention has been described with reference to a preferred embodiment as currently contemplated, it should be understood that the invention is not intended to be limited to that embodiment. Accordingly, the invention is intended to encompass various modifications and arrangements that are within the scope of the claims.

What is claimed is:

1. An electric distribution panel comprising:

a walled enclosure comprising an electrically conductive wall forming a portion of the enclosure;

an electrically conductive neutral bar disposed within the enclosure;

an electrically non-conductive part disposed between the neutral bar and the wall to place the neutral bar in a non-bonded relationship to the wall;

a through-hole in the neutral bar;

a through-hole in the electrically non-conductive part in underlying registry with the through-hole in the neutral bar;

an electrically conductive part adapted for optional bonding of the neutral bar to the wall, the electrically conductive part comprising a head and a shank extending distally from the head, the shank comprising a thread;

wherein the electrically conductive part is pre-assembled to the non-conductive part in a non-bonding position not bonding the neutral bar to the wall so as thereby to allow an installer of the panel to select between the option of maintaining the electrically conductive part in the pre-assembled non-bonding position and the option of positioning the electrically conductive part from non-bonding position to a bonding position wherein the electrically conductive part bonds the neutral bar to the wall;

wherein the pre-assembled non-bonding position is defined by the shank thread having a threaded engagement with the through-hole in the electrically non-conductive part, the head of the electrically conductive part being spaced from the neutral bar, and the shank being spaced from the wall; and wherein the bonding position is defined by the head of the electrically conductive part being disposed against the neutral bar, and the shank being disposed against the wall.

2. An electric distribution panel as set forth in claim 1 wherein the wall comprises a hole in underlying registry with the through-holes in the neutral bar and in the electrically non-conductive part, and the shank thread threads into the hole in the wall when the electrically conductive part is placed in bonding position.

3. An electric distribution panel as set forth in claim 2 wherein the hole in the wall is an extruded hole, and the shank thread comprises a self-tapping thread that threads into the extruded hole in the wall when the electrically conductive part is placed in bonding position.

4. An electric distribution panel as set forth in claim 3 wherein the shank thread has at least two full turns of engagement with the extruded hole in the wall when the electrically conductive part is placed in bonding position.

5. An electric distribution panel as set forth in claim 1 including additional neutral bars disposed within the enclosure, and wherein the neutral bar containing the through-hole is a neutral tie bar that is at a right angle to, and ties together, the additional neutral bars.

6. An electric distribution panel as set forth in claim 5 wherein the electrically non-conductive part comprises a basepan disposed between the neutral bars and the wall.

7. An electric distribution panel as set forth in claim 1 wherein the threaded engagement of the shank thread with the through-hole in the electrically non-conductive part has a frictional engagement lying within a range from about five inch-pounds of torque to about eight inch-pounds of torque when the electrically conductive part is in pre-assembled position.

8. An electric distribution panel as set forth in claim 1 wherein the shank is spaced at least one-half inch from the wall when the electrically conductive part is in pre-assembled position.

9. An electric distribution panel as set forth in claim 1 wherein the shank thread maintains a threaded engagement with the through-hole in the electrically non-conductive part when the electrically conductive part is in bonding position.

\* \* \* \* \*